US011873382B2

United States Patent
Kumar et al.

(10) Patent No.: US 11,873,382 B2
(45) Date of Patent: Jan. 16, 2024

(54) 3D PRINTABLE POLYMERIC LIGHTNING STRIKE PROTECTION SYSTEM FOR FIBER REINFORCED COMPOSITES

(71) Applicant: UT-Battelle, LLC, Oak Ridge, TN (US)

(72) Inventors: Vipin Kumar, Oak Ridge, TN (US); Ahmed A. Hassen, Oak Ridge, TN (US); Christopher J. Hershey, Oak Ridge, TN (US); Seokpum Kim, Oak Ridge, TN (US); Vlastimil Kunc, Oak Ridge, TN (US); John M. Lindahl, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 0 days.

(21) Appl. No.: 17/708,210

(22) Filed: Mar. 30, 2022

(65) Prior Publication Data

US 2022/0315733 A1 Oct. 6, 2022

Related U.S. Application Data

(60) Provisional application No. 63/167,761, filed on Mar. 30, 2021, provisional application No. 63/213,330, filed on Jun. 22, 2021.

(51) Int. Cl.

| | |
|---|---|
| C08K 3/14 | (2006.01) |
| H01B 1/06 | (2006.01) |
| F03D 80/30 | (2016.01) |
| C08J 7/00 | (2006.01) |
| B64D 45/02 | (2006.01) |
| C08J 5/04 | (2006.01) |
| C08K 3/04 | (2006.01) |
| C08J 7/044 | (2020.01) |
| C08J 7/04 | (2020.01) |

(52) U.S. Cl.
CPC ............... *C08K 3/14* (2013.01); *B64D 45/02* (2013.01); *C08J 5/042* (2013.01); *C08J 7/044* (2020.01); *C08J 7/0427* (2020.01); *C08K 3/041* (2017.05); *F03D 80/30* (2016.05); *H01B 1/06* (2013.01); *C08J 2300/24* (2013.01); *C08J 2400/12* (2013.01); *C08K 2201/001* (2013.01)

(58) Field of Classification Search
CPC ... H01B 1/02; H01B 1/04; H01B 1/06; C09D 5/24; C08K 3/14; C08K 3/041; C08J 7/043; F03D 80/30
See application file for complete search history.

(56) References Cited

U.S. PATENT DOCUMENTS

| | | | |
|---|---|---|---|
| 2018/0079172 A1 | 3/2018 | Day et al. | |
| 2018/0371190 A1* | 12/2018 | Chopra | .................. C08L 79/08 |
| 2019/0280301 A1 | 9/2019 | Pan et al. | |

OTHER PUBLICATIONS

Tanvir et al "Electrically Conductive, Transparent Polymeric Nanocomposites Modified by 2D Ti3C2Tx (MXene)", Polymers 2019, 11, 1272; doi:10.3390/polym11081272.*
Aakyiir et al "Elastomer nanocomposites containing MXene for mechanical robustness and electrical and thermal conductivity", Nanotechnology 31 (2020) 315715 (14pp).*
Jimmy et al "Mxene functionalized polymer composites: Synthesis and applications", European Polymer Journal 122 (2020) 109367.*
Sliozberg et al "Interface binding and mechanical properties of MXene-epoxy nanocomposites ", Composites Science and Technology 192 (2020) 108124.*
Wang et al "Fabrication on the annealed Ti3C2Tx MXene/Epoxy nanocomposites for electromagnetic interference shielding application", Composites Part B 171 (2019) 111-118.*
Yin et al "Multilayer structured PANI/MXene/CF fabric for electromagnetic interference shielding constructed by layer-by-layer strategy", Colloids and Surfaces A 601 (2020) 125047.*
Frigione et al "Recent Advances and Trends of Nanofilled/ Nanostructured Epoxies", Materials 2020, 13, 3415; doi: 10.3390/ma13153415.*
Wang et al "High-Performance Biscrolled MXene/Carbon Nanotube Yarn Supercapacitors", Small 2018, 14, 1802225.*
Kumar, V. et al., "Polyaniline-based all-polymeric adhesive layer: An effective lightning strike protection technology for high residual mechanical strength of CFRPs", Composites Science and Technology 172, (Mar. 2019), pp. 49-57.
International Search Report and Written Opinion of the International Searching Authority for PCT/US22/022419, dated Dec. 28, 2022, 8 pages.
Kumar et al., "Reduced de-doping and enhanced electrical conductivity of polyaniline filled phenol-divinylbenzene composite for potential lighting strike protection application", Synthetic Metals, 249(), 81-89 (2019).
Liu et al., "Functionalization with MXene (Ti3C2) Enhances the Wettability and Shear Strength of Carbon Fiber-Epoxy Composites", ACS Applied Nano Materials, 5553-5560 (2019).

* cited by examiner

*Primary Examiner* — Mark Kopec
(74) *Attorney, Agent, or Firm* — WARNER NORCROSS + JUDD LLP

(57) ABSTRACT

The current embodiments include all-polymeric protective material for mitigating lightning strike damage. The protective material includes a hybrid matrix comprising PANI and MXene dispersed within a thermosetting epoxy resin. This hybrid matrix can be painted, printed, or applied as a conductive polymeric layer to a FRCP structure, for example an aircraft fuselage, wing, empennage, control surface (aileron, flap, slats, rudder, elevator) or a wind turbine blade. The protective material not only withstands lightning strikes, but also functions as shielding against electromagnetic interference and is corrosion-resistant and lightweight.

4 Claims, No Drawings

3D PRINTABLE POLYMERIC LIGHTNING STRIKE PROTECTION SYSTEM FOR FIBER REINFORCED COMPOSITES

CROSS-REFERENCE TO RELATED APPLICATIONS

This application claims the benefit of U.S. Provisional Application 63/213,330, filed Jun. 22, 2021, and U.S. Provisional Application 63/167,761, filed Mar. 30, 2021, the disclosures of which are incorporated by reference in their entirety.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF THE INVENTION

The present invention relates to lightning strike protection for carbon fiber reinforced plastics in aerospace structures and wind turbine blades.

BACKGROUND OF THE INVENTION

Carbon fiber reinforced plastics (CFRPs) are increasingly used in the manufacture of aircraft structures (e.g., wings, empennage, and flight control surfaces) and wind turbine blades. However, lightning strikes are a reoccurring hazard for these structures. During a lightning strike, a massive surge of electrical current passes through the structure. If the structure does not possess enough electrical conductivity to dissipate the incident current, these structures can be destroyed due to the extreme amount of heat produced by resistive heating. CFRPs possess excellent mechanical properties but lack electrical conductivity due to the insulating nature of the epoxy resin. This low electrical conductivity makes CFRPs highly vulnerable to lightning strikes.

Engineers have used a range of protective methods, including highly conductive coatings, to render CFRP structures safe against lightning strikes. Metal mesh coatings including copper (Cu), aluminum (Al), and nickel (Ni) films are typical forms of lightning strike protection for CFRPs. However, there remains a continued need for an improved system for protecting CFRPs against lightning strikes. For example, existing systems can experience galvanic corrosion at the metal/carbon composite interface. Existing systems also possess an increase in structural weight due to the inclusion of metals within the CFRP structure. Further by example, the weight of metal mesh foils for use in conventional systems ranges from 76 grams per square meter to 250 grams per square meter, depending on the location of the aircraft. These metal mesh foils require additional epoxy to bond with CFRP structures and may also require a separation layer. Therefore, the weight penalty associated with metal mesh foils can be significant.

SUMMARY OF THE INVENTION

An all-polymeric protective material for mitigating lightning strike damage is provided. The protective material can comprise an adhesive for direct application to a CFRP structure, for example an aircraft exterior or a wind turbine blade. The protective material not only withstands lightning strikes, but also functions as shielding against electromagnetic interference and is corrosion-resistant and lightweight, particularly when compared to metal-mesh coatings.

In one embodiment, the all-polymeric protective material comprises an electrically conductive adhesive layer including a conductive filler dispersed in an organic or polymer matrix. The conductive filler includes MXene powders and a conductive polymer. The MXene particles include highly-conductive two-dimensional transition metal carbides and nitrides. MXenes have the general formula of $M_{n+1}X_nT_z$, where M is an early transition metal (e.g., Ti, V, Cr, Nb, Mo), X is carbon and/or nitrogen, and $T_z$ is a functional group (e.g., 0, OH, and F). MXenes are also known to possess high electrical conductivity, up to $2.4 \times 10^4$ S/cm. Alternatively, or in addition, the conductive filler can include carbon nanotubes (CNTs), including single-wall carbon nanotubes (SWCNT). The conductive polymer includes polyaniline (PANI) in some embodiments, but can include other conductive polymers in other embodiments. The combination of a conductive polymer, as a positive charge carrier, and MXene powders, as a negative charge carrier, within an organic or polymer matrix can achieve an electrical conductivity of at least 1000 S/m or more. The protective material can replace conventional metal-mesh systems, while saving weight and integration/repair costs.

In one embodiment, a method for manufacturing the protective material is provided. The method includes combining a plurality of MXene particles and phenol resin to form a first mixture. MXene powders can be etched layers (chemically delaminated) of a MAX-phase precursor, for example $Ti_3AlC_2$. Other forms of MXene can also be used. The method also includes combining a conductive polymer (e.g., PANI) and dodecyl benzene sulfonic acid (DBSA) to form a second mixture. The method then includes combining the first mixture and the second mixture to achieve a third mixture comprising a conductive filler that is dispersed in a thermosetting resin, wherein the conductive filler includes the plurality of MXene particles and the conductive polymer dispersed therein.

In these and other embodiments, the MXene powders are present in the protective material at 1 wt. % to 10 wt. %, inclusive, and PANI is present in the protective material at 10 wt. % to 30 wt. %, inclusive. Because PANI loses its electrical conductivity if heated to more than 150° C., PANI is typically limited to generally one lightning strike in prior art systems. However, the addition of MXene and CNTs enables a PANI-based polymeric protective material to survive multiple lightning strikes. In addition, the all-polymeric protective material functions as a faraday cage for CFRP structures. High thermal stability (up to 300° C.) and low flammability of the all-polymeric protective material makes it an ideal candidate for aerospace and wind turbine applications in place of metal-mesh coatings. These and other features of the invention will be more fully understood and appreciated by reference to the description of the current embodiments.

DETAILED DESCRIPTION OF THE CURRENT EMBODIMENTS

The current embodiments include all-polymeric protective coating for mitigating lightning strike damage and electromagnetic interference. The protective coating includes MXene particles and a conductive polymer, for example PANI, dispersed in an organic or polymer matrix.

The protective coating can be painted, brushed, sprayed, printed, or applied as a conductive polymeric layer to FRCP structures, for example an aircraft fuselage, wing, empennage, control surfaces (e.g., ailerons, flaps, slats, rudders, elevators) or a wind turbine blade, by non-limiting example. Part I below includes a method for manufacturing the protective coating, and Part II below includes a laboratory example in which the protective coating was evaluated against a simulated lightning strike.

I. Method of Manufacture

The present method generally includes (a) combining a plurality of MXene particles and a phenol resin to form a first mixture, (b) combining a conductive polymer (e.g., PANI) and a curing agent (e.g., dodecyl benzene sulfonic acid (DBSA)) to form a second mixture, and (c) combining the first mixture with the second mixture to achieve a conductive filler that is dispersed in an organic or polymer matrix, wherein the conductive filler includes the plurality of MXene particles (with or without nanotubes) and the conductive polymer. Each step is separately discussed below.

Forming the first mixture includes combining a plurality MXene particles and a phenol resin. The plurality of MXene particles include powders, flakes, platelets, granules, or combinations thereof. The MXene particles can be obtained by delamination (chemical etching) from a MXene precursor, for example $Ti_3AlC_2$, using a solvent, for example LiF or HF. Furthermore, MXene is added to divinylbenzene (DVB) to make a dispersed solution. DVB is advantageous because, as discussed below, DVB is also a cross-linking agent. Consequently, a MXene-DVB suspension can be directly converted into a thermosetting structural composite without intermediate processing. In other embodiments, MXene particles can be added to a solution of DVB (or other cross-linking agent) to create the first mixture. Alternatively, or in addition, the conductive filler can include carbon nanotubes (CNTs).

Forming the second mixture includes combining a conductive polymer with a curing agent. The conductive polymer can include one or more of the following, by non-limiting example: polyaniline, polypyrrole, polythiophene, polyacetylene, or polyphenylene. The curing agent includes dodecyl benzene sulfonic acid (DBSA) in the current embodiment, however other curing agents can be used in other embodiments as desired. Semi-doped PANI-DBSA acts as a cationic scavenger and helps in the controlled curing of the cross-linking agent DVB, which otherwise undergoes an uncontrolled exothermic reaction when cured with unbounded protic acids.

MXenes can be present in the composite matrix at 1-20 wt. %, optionally 1-10 wt. %, further optionally 2 wt. %. In laboratory testing, the addition of MXenes at 2 wt. % demonstrated approximately 139%, 10%, and 9% improvement in electrical conductivity, flexural strength, and flexural modulus, respectively, compared to neat PANI-DVB composites. Further, as PANI is positively charged and MXene is negatively charged, a strong electrostatic bond enhances adhesion between PANI and MXene.

The composite matrix can be processed at or near room temperature as an electrically conductive adhesive layer. For example, the composite matrix can be spray coated, screen printed, dip-coated, slot-die printed, or ink-jet printed onto a suitable substrate, for example a FRCP surface. The resultant adhesive layer, once cured when subject to heat or light, can withstand lightning strikes and can also act as electromagnetic interference shielding and as a corrosion resistant coating.

II. Laboratory Example

The present invention is further described below in connection with the following laboratory example, which is intended to be non-limiting.

$Ti_3C_2T_z$ MXene powders were synthesized by selectively etching Al layers from the parent $Ti_3AlC_2$ MAX phase. The synthesis of the MAX phase started with elemental mixing of titanium (Ti, −325 mesh, 99%, Alfa Aesar), aluminum (Al, −325 mesh, 99.5%, Alfa Aesar), and graphite (C, 7-11 μm, 99%, Alfa Aesar) in a Turbula T2F mixer for 3 hours accompanied with 15 zirconia spheres of a 10 mm diameter. The atomic ratio used for Ti:Al:C was equivalent to 3.00:1.20:1.88. The mixed powders were loaded in an alumina crucible that was placed in an alumina tube inside an induction furnace and under argon flow from room temperature up to 1600° C. with a heating rate of 10° C./min. The temperature was held at 1600° C. for two hours, and the mixture was allowed to cool to room temperature.

The MAX phase was ground to less than 45 μm particles before etching. The etching solution included 9 M hydrochloric acid (HCL, Fischer Chemicals) in water (20 mL for each 1 g of $Ti_3AlC_2$) and 7.5 moles of lithium fluoride (LiF, −325 mesh, 98.5%, Alfa Aesar) for each 1 mole of $Ti_3AlC_2$. The powders were added slowly to the etching solution using a Teflon-coated magnetic stir bar. The mixture was stirred at 500 rpm in an oil bath on a hot plate at 35° C. for 24 hours. The resultant powders were washed by dividing the mixture equally into 50 mL centrifuge tubes (1 tube for each 0.5 g of starting MAX powder) and adding de-ionized (DI) water, then centrifuging at 3500 rpm for 5 minutes. The supernatant was decanted and replaced with DI water, and the sediment was redispersed completely using a vortex mixer before centrifuging again. The washing cycles were repeated several times until a pH of greater than 6 was achieved.

The multi-layer MXene powders (0.5 g) were added to 15 mL DVB (technical grade—80%, Sigma Aldrich) and sonicated (60 Hz) for one hour followed by one hour dispersion using a mixer at 1500 rpm. The process was repeated three times to obtain a homogenized mixture. A stable colloidal solution of MXene powders into the DVB resin was obtained. No sedimentation was observed over 48 hours at room temperature. In parallel, 10 grams of PANI (99%, emeraldine base, Regulus Ltd.) and 20 g of DBSA (mixture of isomers, ≥95%, Sigma Aldrich) in 1:2 weight ratio were mixed using a mixer at 1500 rpm for 10 minutes. The mixing process was repeated three times to obtain a homogenized mixture of PANI and DBSA.

The PANI-DBSA mixture (5.0 grams) was added to the MXene-DVB mixture (7.5 grams) and mixed at 1500 rpm for 10 minutes. The final weight percentage included 2 wt. % MXene, 13.33 wt. % PANI, 26.66 wt. % DBSA, and 58 wt. % DVB. The resultant mixture was poured onto a commercial CFRP panel (23 cm×23 cm×3.17 mm, McMaster Carr) and dried at 80° C. for 2 hours, resulting in a 40 μm coating. An uncoated CFRP panel was used as a reference panel. As reported by the manufacturer, each such panel included a PAN-based woven fabric with a tensile strength of between 827 and 1200 MPa, a compressive strength of between 517 and 880 MPa, a flexural strength of between 613 and 1200 MPa, and a service temperature up to 82.2° C.

An impulse current generator was used to simulate lightning strike tests on the coated panel and the reference panel. Each panel was grounded to a copper plate and clamped down. The copper plate was further grounded using braided copper wires for the safe exit of the current to ground. A discharge probe was positioned immediately above the panel, which was tested against a simulated lightning strike of 100 kA.

The simulated lightning strike was recorded for the coated CFRP panel and the reference CFRP panel. In the case of the reference CFRP panel, the incident electrical current could not find a conductive path to dissipate quickly to ground. In the case of the coated CFRP panel, a linear flash indicated the presence of a highly conductive path for the incident electrical current to flow from the discharge electrode to the grounded copper braid. The current took the shortest past from the discharge path to the ground wire via the PANI-MXene conductive coating. The reference CFRP panels suffered significant catastrophic damage, and the resin ignited due to the extreme Joule heating caused by the simulated lightning strike, with flames lasting for 34 seconds. The coated CFRP panel did suffer fiber and resin burning, however the damage was significantly less than for the reference CFRP panel, with flames lasting only 6 seconds. The MXene combustion created an inert and insulating coating due to the presence of fluorine functional groups, which possess flame retardant properties. More particularly, damage in the reference CFRP panel spread to a total area of about 40.61 $cm^2$, while the damage to the protected CFRP panel was limited to about 13.29 $cm^2$. Further, ultrasound results revealed that the unprotected CFRP measured 2.1 mm depth of damage, while the protected CFRP experienced only 0.9 mm depth of damage, reducing the damage by just less than half.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. An electrically conductive composition comprising:
   a conductive filler comprising a plurality of MXene particles intermixed with polyaniline, wherein the plurality of MXene particles are negatively charged and include powders, flakes, platelets, or granules of $Ti_3C_2$, and wherein the polyaniline is positively charged, such that the plurality of MXene particles adhere to the polyaniline by an electrostatic bond;
   wherein the conductive filler is dispersed in a thermosetting resin, the thermosetting resin including divinylbenzene (DVB) as a cross-linking agent and a phenol resin, and wherein the plurality of MXene particles are present in the composition at 1 wt. % to 10 wt. %, inclusive.

2. The composition of claim 1, wherein the conductive filler further includes a plurality of carbon nanotubes.

3. The composition of claim 1, wherein the conductive filler is present in the composition at 10 wt. % to 30 wt. %, inclusive.

4. A composite structure comprising:
   a fiber reinforced composite including an exterior portion of an airframe, an aircraft flight control surface, or a wind turbine blade; and
   an electrically conductive coating applied to the fiber reinforced composite, wherein the electrically conductive coating includes a plurality of MXene particles and polyaniline, wherein the plurality of MXene particles are negatively charged and include powders, flakes, platelets, or granules of $Ti_3C_2$, and wherein the polyaniline is positively charged, such that the plurality of MXene particles are adhered to the polyaniline by an electrostatic bond, wherein the plurality of MXene particles and the polyaniline are dispersed within a polymer matrix, the polymer matrix including divinylbenzene (DVB) as a cross-linking agent and a phenol resin, and wherein the plurality of MXene particles are present in the coating at 1 wt. % to 10 wt. %, inclusive.

* * * * *